(12) United States Patent
Oddie

(10) Patent No.: US 9,223,316 B2
(45) Date of Patent: Dec. 29, 2015

(54) BACKFLOW AND FLOW RATE CONTROL VALVE

(75) Inventor: Gary Oddie, St. Neots (GB)

(73) Assignee: Schlumberger Technology Corporation, Cambridge, MA (US)

( * ) Notice: Subject to any disclaimer, the term of this patent is extended or adjusted under 35 U.S.C. 154(b) by 532 days.

(21) Appl. No.: 12/525,569

(22) PCT Filed: Mar. 20, 2008

(86) PCT No.: PCT/GB2008/001016
§ 371 (c)(1),
(2), (4) Date: Oct. 13, 2009

(87) PCT Pub. No.: WO2008/117036
PCT Pub. Date: Oct. 2, 2008

(65) Prior Publication Data
US 2010/0043887 A1 Feb. 25, 2010

(30) Foreign Application Priority Data
Mar. 24, 2007 (GB) .................................. 0705694.8

(51) Int. Cl.
*G05D 7/01* (2006.01)

(52) U.S. Cl.
CPC .......... *G05D 7/0106* (2013.01); *Y10T 137/0379* (2015.04); *Y10T 137/3631* (2015.04); *Y10T 137/7783* (2015.04); *Y10T 137/7785* (2015.04); *Y10T 137/7787* (2015.04);
(Continued)

(58) Field of Classification Search
CPC ........... G05D 7/0106; Y10T 137/0379; Y10T 137/8593; Y10T 137/3631; Y10T 137/7783; Y10T 137/7785; Y10T 137/7787; Y10T 137/7788; Y10T 137/7789; Y10T 137/7791
USPC .................. 137/496, 500, 501, 502, 503, 458
See application file for complete search history.

(56) References Cited

U.S. PATENT DOCUMENTS 2,579,334 A * 12/1951 Plank ............................... 251/54
2,881,793 A * 4/1959 Lee .................................. 137/501
(Continued)

FOREIGN PATENT DOCUMENTS

DE 746386 C 7/1944
FR 2249273 A 5/1975
(Continued)

OTHER PUBLICATIONS

Combined Search and Examination Report of British Application Serial No. 0705694.8 dated Jun. 28, 2007.
(Continued)

*Primary Examiner* — William McCalister

(57) ABSTRACT

A backflow and flow rate control system, comprising: a flow restrictor; a flow regulator chamber located down-stream of the flow restrictor; a control chamber configured to receive a portion of the fluid from a location upstream of the flow restrictor; a moveable element with no sliding parts positioned between the control chamber and the flow regulator chamber, wherein the moveable element is configured to move in response to a difference in pressure between the flow regulator chamber and the control chamber; a flow rate regulator configured to control the flow rate of the fluid in response to the movement of the moveable element; and a non-return regulator coupled with the moveable element and configured to control back-flow of the fluid.

6 Claims, 2 Drawing Sheets

(52) U.S. Cl.
CPC ..... *Y10T 137/7788* (2015.04); *Y10T 137/7789* (2015.04); *Y10T 137/7791* (2015.04); *Y10T 137/8593* (2015.04)

(56) References Cited

U.S. PATENT DOCUMENTS

| | | | |
|---|---|---|---|
| 3,608,574 A * | 9/1971 | Beaussant | 137/102 |
| 4,250,915 A * | 2/1981 | Rikuta | 137/501 |
| 4,817,664 A * | 4/1989 | Chang | 137/458 |
| 5,083,546 A * | 1/1992 | Detweiler et al. | 123/520 |
| 5,509,395 A * | 4/1996 | Cook | 123/518 |
| 5,642,752 A * | 7/1997 | Yokota et al. | 137/413 |
| 5,722,454 A | 3/1998 | Smith et al. | |
| 6,026,849 A * | 2/2000 | Thordarson | 137/501 |
| 6,062,257 A | 5/2000 | Wild et al. | |
| 6,182,688 B1 * | 2/2001 | Fabre | 137/503 |
| 6,554,023 B2 * | 4/2003 | Danby et al. | 137/510 |
| 6,595,231 B1 | 7/2003 | Best | |
| 6,755,978 B2 | 6/2004 | Oddie | |
| 6,923,197 B2 * | 8/2005 | Vitale | 137/12 |
| 7,111,638 B2 * | 9/2006 | Johnson | 137/460 |
| 7,128,086 B2 * | 10/2006 | Kirchner et al. | 137/501 |

FOREIGN PATENT DOCUMENTS

| | | |
|---|---|---|
| GB | 738773 A | 10/1955 |
| GB | 2374620 A | 10/2002 |

OTHER PUBLICATIONS

Examination Report of British Application Serial No. 0705694.8 dated Apr. 14, 2009.
International Search Report and Written Opinion of PCT Application Serial No. PCT/GB2008/001016 dated Jul. 3, 2008.
"FC Valve," Product Bulletin 186-02, W. A. Kates Company, Nov. 2000: pp. 1-4, <www.wakates.com/pdf/blt_186.pdf>.
H. C. Conway, "Fluid Pressure Mechanisms," New York: Pitman Publishing, Third Edition 1974: pp. 126-127 and 134-135.

* cited by examiner

BACKFLOW AND FLOW RATE CONTROL VALVE

BACKGROUND OF THE INVENTION

This disclosure relates in general to a method and system for controlling a flow of a substance through a conduit. More specifically, but not by way of limitation, some embodiments of the present invention provide for controlling both the backflow and the flow rate of the substance in the conduit. In an embodiment of the present invention, the backflow and the flow rate of the substance are controlled without the use of sliding parts using a moveable element, membrane or the like. Counter force mechanisms, spring constant of the moveable element, elasticity of the moveable element or the like, in certain embodiments of the present invention, may provide for full forward and/or backward flow control.

Previously, flow rate control systems have generally involved piston type systems. These piston systems are in general either dumb systems that do not adapt to changes in the flow in the conduit or are cumbersome systems with complex controlling mechanisms. Additionally, the piston systems do not address issues regarding control of backflow, are susceptible to deterioration in operation due to wear, corrosion, adverse affects of solid particulates and/or the like and are not capable of accurately controlling low flow rates.

SUMMARY OF THE INVENTION

This disclosure relates in general to a method and system for controlling a flow of substance through a conduit. Embodiments of the present invention may provide for controlling flow through a conduit, without the use of sliding parts, using a moveable element that may move in response to differential pressures associated with the flow and may comprise a spring constant, elastic constant and/or the like to provide for predictable/pre-determined movement the moveable element in response to differential pressures in the flow. More specifically, but not by way of limitation, some embodiments of the present invention may provide for controlling both the backflow and the flow rate of the substance in the conduit and for accurately controlling low flow rates. Additionally, counter force mechanisms in certain embodiments of the present invention may provide for full forward and/or backward flow control.

In one embodiment of the present invention a method for controlling flow properties of a fluid flowing in a conduit may comprise:
- diverting a portion of the fluid flowing in the conduit to a control location;
- passing an un-diverted portion of the fluid flowing in the conduit through a flow restrictor to a location downstream of the flow restrictor; and
- using movements of a moveable element with no sliding parts to operate a flow rate regulator to control the flow rate of the un-diverted portion of the fluid flowing in the conduit, wherein the moveable element is configured to move in response to a pressure difference between the diverted portion of the diverted portion of the fluid flowing in the conduit at the control location flowing and the un-diverted portion of the fluid flowing in the conduit at the location downstream of the flow restrictor.

Further, a non-return regulator may be coupled with the moveable element to prevent the fluid from flowing in an upstream direction through the conduit. The moveable element may comprise a bellows, a diaphragm or the like that may allow the moveable element to move without the use of sliding parts. In an embodiment, a control device, such as a compressible or stretchable material may be coupled with the moveable element to hold the moveable element in a specific configuration when predetermined fluid flows occur.

In a further embodiment of the present invention, a system for controlling flow rate and back flow of a fluid flowing in a conduit is provided that may comprise:
- a flow restrictor coupled with the conduit;
- a flow regulator chamber coupled with the flow restrictor and located downstream of the flow restrictor;
- a control chamber configured to receive a portion of the fluid flowing in the conduit from a location upstream of the flow restrictor;
- a moveable element with no sliding parts positioned so that at least a part of the moveable element is disposed between the control chamber and the flow regulator chamber, wherein the moveable element is configured to move in response to a difference in pressure between the flow regulator chamber and the control chamber;
- a flow rate regulator coupled with the moveable element and configured to control the flow rate of the fluid in response to the movement of the moveable element; and
- a non-return regulator coupled with the moveable element and configured to control back-flow of the fluid.

BRIEF DESCRIPTION OF THE DRAWINGS

In the figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The invention will be better understood in the light of the following description of non-limiting and illustrative embodiments, given with reference to the accompanying drawings, in which.

DETAILED DESCRIPTION OF THE INVENTION

This disclosure relates in general to a method and system for controlling a flow of a substance through a conduit. More specifically, but not by way of limitation, embodiments of the present invention provide for controlling both the backflow and the flow rate of the substance in the conduit and for accurately controlling low flow rate flows through the conduit. In certain aspects of the present invention, the backflow and the flow rate are controlled without the use of sliding parts. Counter force mechanisms in certain embodiments of the present invention may provide for full forward and/or backward flow control.

In many industries, including the hydrocarbon industry, flow control may be an important matter. In the hydrocarbon industry and other industries where flows to be controlled may be flowing under inclement conditions—such as under high pressures and/or high temperature in downhole locations, in remote and/or sub-sea locations, where the flow itself contains corrosive substances, pollutants, solid contaminants viscous substances and/or the like—simple to operate, robust and/or compact flow control devices may be desirable and/or necessary. Additionally, it is often necessary to sample small portions of flowing substances for analysis purposes or to obtain samples of a substance with a low flow rates for analysis purposes, i.e., to increase sensing time, to prevent disturbance in the flow and/or the like.

Figure 1:
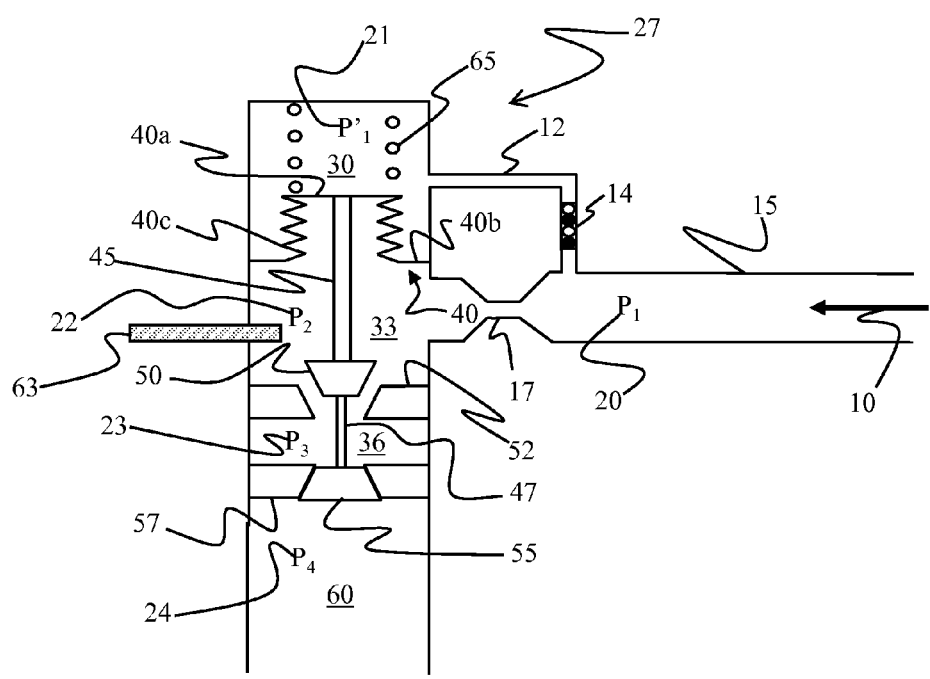
FIG. 1 is a schematic-type illustration of a system for providing full forward and reverse flow control of substances flowing in a conduit, in accordance with an embodiment of the present invention.

FIG. 1 is a schematic-type illustration of a system for providing full forward and reverse flow control of substances flowing in a conduit, in accordance with an embodiment of the present invention. In FIG. 1, a fluid flow 10 flows through a conduit 15. The conduit 15 may be a part of a pipeline. In the conduit 15, the fluid flow may have a pressure $P_1$ 20.

In an embodiment of the present invention, a full forward and reverse flow control device 27 may comprise a secondary conduit 12 that may provide a flow path for flowing a portion of the fluid flow 10 from the conduit 15 into a valve control chamber 30. In certain aspects, a damping restriction 14 may be coupled with the secondary conduit 12 to provide for controlling the portion of the fluid flow 10 flowing through the secondary conduit 12. As provided in FIG. 1, the portion of the fluid flow 10 flowing into the valve control chamber 33 may have a pressure $P'_1$ 21. In certain aspects of the present invention, the pressure $P'_1$ 21 may be the same as the pressure $P_1$ 20. In other aspects, devices may be coupled with the secondary conduit 12 and/or the valve control chamber 33 to provide that the pressure $P'_1$ 21 is not the same as the pressure $P_1$ 20

In an embodiment of the present invention, a flow restrictor 17 may be coupled with the conduit so as to restrict the flow of the fluid flow 10. The flow restrictor 17 may be coupled with the conduit 15 and a first flow chamber 33 to provide that the fluid flow 10 may flow through the flow restrictor 17 and into the first flow chamber 33.

As provided in FIG. 1, fluid in the first flow chamber 33 may be at a pressure $P_2$ 22. In an embodiment of the present invention, the fluid flow 10 experiences a pressure drop across the flow restrictor 17 as the fluid flow 10 flows through the flow restrictor 17. As a consequence, the pressure $P_2$ 22 is less than the pressure $P_1$ 20 and, absent any mechanism in the system to increase the pressure $P'_1$ 21 above that of $P_1$ 21, the pressure $P'_1$ 21. Moreover, as the rate of flow of the fluid flow 10 increases the pressure drop across the flow restrictor 17 also increases resulting in an increase in a the pressure differential between the pressure $P'_1$ 21 and the pressure $P_2$ 22.

In an embodiment of the present invention, the valve control chamber 30 and the first flow chamber 33 may separated by a pressure transfer wall 40. The pressure transfer wall 40 may comprise a wall that is capable of transforming/deforming in shape in response to a difference in pressure between the pressure $P'_1$ 21 and the pressure $P_2$ 22.

The pressure transfer wall 40 may comprise a transformable/deformable substrate or system of substrates that provides for transformation/deformation without any sliding parts and/or contact with the inner walls of either the valve control chamber 30 or the first flow chamber 33. In this way, the pressure transfer wall 40 may operate in environments in which the fluid flow 10 contains solid contaminants and without the wear, the erosion and/or the like associated with sliding parts. The pressure transfer wall 40 may comprise a material or materials that may be heat resistant, pressure resistant, corrosion resistant and/or the like. In certain aspects wear resistant coatings or the like may be applied to the pressure transfer wall 40.

In some aspects of the present invention, the pressure transfer wall 40 may comprise a substrate 40a that may be coupled with the inner walls of the valve control chamber 30 and/or the first flow chamber 33 or a second substrate 40b (which may in turn be coupled with the inner walls of either the valve control chamber 30 or the first flow chamber 33) by bellows 40c. In other aspects, the substrate 40a may be coupled with the inner walls of the valve control chamber 30 and/or the first flow chamber 33 or a second substrate 40b (which may in turn be coupled with the inner walls of either the valve control chamber 30 or the first flow chamber 33) by diaphragms (not shown). In yet other aspects, the pressure transfer wall 40 may comprise a diaphragm(s), bellows, compliant element and/or the like that is capable of transforming/deforming in response to a pressure difference between the pressure $P'_1$ 21 and the pressure $P_2$ 22.

Merely by way of example, the pressure transfer wall 40 may comprise stainless steel, elastomers, plastics, nickel alloy, treated steel, polymer, ceramics and/or the like. Without using sliding parts, the pressure transfer wall 40 may be more robust then a piston-type control. Further, the pressure transfer wall 40 may provide for control of low flow rates. In contrast to a piston-type system, an embodiment of the present invention may not be limited by issues surrounding the sliding of parts against each other, may use the whole or a majority of the pressure transfer wall 40 to control flow and may use a system such as a bellows, a highly elastic material and/or the like to provide for movement of the pressure transfer wall 40 under even small pressure differentials.

Furthermore, in an embodiment of the present invention, the pressure transfer wall 40 may comprise a spring constant, elasticity constant, resistance to deformation constant, compressibility constant and/or the like, wherein such property (ies) of the pressure transfer wall 40 (i.e., spring response, elasticity, resilience etc.) may provide for resistance to movement of the pressure transfer wall 40 in response to the pressure differential and may provide for returning the pressure transfer wall 40 to a defined position when the pressure differential is a de minimis or nil value. In such an embodiment, the pressure transfer wall 40 may be configured to provide that the pressure transfer wall 40 is in a specific position/orientation/configuration when there is no differential pressure. The spring constant may also provide that the position/configuration of the pressure transfer wall 40 may be predetermined for different differential pressures and, as such, may the pressure transfer wall 40 may be configured with a certain spring constant and/or movement properties to provide desired flow control. The materials of the pressure transfer wall 40 may be selected to provide that the spring constant does not change because of wear, heat etc.

The pressure transfer wall 40 may be coupled with a first connecting member 45 that may in turn be coupled with a rate controlling valve 50. The rate controlling valve 50 may be a valve that is configured to control flow of fluid from the first flow chamber 33 into a second flow chamber 36. Merely by way of example, the rate controlling valve 50 may be a valve that may move within an opening in a seating structure 52 to control the flow of the fluid through the opening in the seating structure 52. Fluid in the second flow chamber 36 may be at a pressure $P_3$.

In an embodiment of the present invention, a second connecting member 47 may connect the rate controlling valve 50 with a non-return valve 55. In certain aspects, the first connecting member 45 and the second connecting member 47 may comprise a single connecting member.

The non-return valve may be a valve configured to control the flow of fluid from the second flow chamber 36 into an outlet 60. In certain aspects, the outlet 60 may be coupled with a section of a pipeline. Merely by way of example, the non-return valve 55 may be a valve that may move within an opening in an outlet seating structure 57 to control the flow of the fluid through the opening in the outlet seating structure 52. Further, the non-return valve 55 may be configured to provide that the non-return valve 55 prevents flow of fluid from the outlet 60 into the second flow chamber 36 when the non-return valve 55 is closed.

In an embodiment of the present invention, the rate controlling valve 50 and the non-return valve 55 may be configured to provide for flow of the fluid flow 10 through the full forward and reverse flow control device 27 and prevention of flow of fluids from the outlet 60 through the full forward and reverse flow control device 27. In other embodiments of the present invention, the rate controlling valve 50 and the non-return valve 55 may be configured to provide for flow of the fluid flow 10 through the full forward and reverse flow control device 27 and prevention of flow of fluids with flow rates above a predetermined flow rate from the outlet 60 through the full forward and reverse flow control device 27.

In certain aspects of the present invention, a compressible/elastic element 65 may be coupled with the pressure transfer wall 40. In such aspects, the compressible/elastic element 65 may provide for hindrance to the movement of the pressure transfer wall 40 in one direction and aid to the movement of the pressure transfer wall 40 in another direction. The compressible/elastic element 65 may comprise a spring, a rubber/elastic member and/or the like. The compressible/elastic element 65 may be configured to determine the conditions/characteristics of fluid flow through the full forward and reverse flow control device 30 under which the rate controlling valve 50 is open, closed or the like and the non-return valve 55 is open, closed or the like.

In an embodiment of the present invention, the full forward and reverse flow control device 27 may be configured so that when the pressure $P_4$ is greater than the pressure $P_3$, the full forward and reverse flow control device 27 may behave as a non-return valve, preventing flow of any fluid from the outlet 60 into the conduit 15. As the pressure $P_1$ is increased as a result of an increase in flow rate of the fluid flow 10—which in turn increases the pressure $P'_1$, the pressure $P_2$ and the pressure $P_3$ —the difference in pressure between the pressure $P'_1$ and the pressure $P_2$ —resulting from the flow through the flow restrictor 17—may become sufficient to overcome the pressure P4 and any force imparted on the rate controlling valve 50 by the pressure transfer wall 40 and/or the compressible/elastic element 65. When this occurs, the non-return valve 55 may open and fluid may start to flow in a forward direction through the full forward and reverse flow control device 27. In certain aspects of the present invention, at this stage, the rate controlling valve 50 may have moved, but may not be significantly restricting flow from the first flow chamber 33 to the second flow chamber 36. At this stage, the flow rate through the full forward and reverse flow control device 27 is proportional to the pressure drop between the pressure $P_1$ and the pressure $P_4$.

Further increases in the pressure $P_1$ may cause increased flow rates and increase the pressure drop across the flow restrictor 17 and increase the pressure differential between the pressure $P'_1$ and the pressure $P_2$. The differential pressure between the pressure $P'_1$ and the pressure $P_2$ may act upon the pressure transfer wall 40 and may cause the first connecting element 45 to move the rate controlling valve 50 so as to reduce the opening in the seating structure 52 restricting the flow through the opening. This reduced flow rate through from the first flow chamber 33 to the second flow chamber 36 may cause the pressure $P_2$ to increase so reducing the differential pressure between the pressure $P'_1$ and the pressure $P_2$ reducing the force on the pressure transfer wall 40 and/or the compressible/elastic element 65 and resulting in the rate controlling valve 50 opening. In this way, an embodiment of the present invention may provide a feedback loop that may provide for adjusting the differential pressure between the pressure $P_2$ and the pressure $P'_1$ so that with the use of predetermined configuration of the pressure transfer wall 40 and/or the compressible/elastic element 65 a constant flow rate through the full forward and reverse flow control device 30 may be provided that is independent of the pressure drop across the full forward and reverse flow control device 30.

In certain aspects of the present invention, a sensor 63 may be positioned coupled with the full forward and reverse flow control device 30. The sensor may be a pressure sensor, a flow meter, a phase detector, a fluid analyser and/or the like. In some aspects the sensor may provide for analysing the properties of the fluid flow 10. In such embodiments, the system may provide a compact and robust system that may control fluid flow and provide for sensing properties of the fluid flow at the control location. Moreover, changes in the properties of the fluid flow caused by the full forward and reverse flow control device 30 may be combined with sensor data from the sensor 63 to analyze the fluid and/or the fluid flow. For example pressure drop measurement over the flow restrictor 17 may be combined with other sensed properties from the sensor 63 to analyze the fluid flowing through the full forward and reverse flow control device 30 and/or the flow properties of the fluid.

In other aspects, data from the sensor 63, such as pressure measurements, flow rate and/or the like may be output to a control processor (not shown). In turn, the control processor may use the data to provide for controlling a size of a flow restriction of the flow restrictor 17, the position of the pressure transfer wall 40 and/or the like. In this way, the control processor may affect and/or control operation of the full forward and reverse flow control device 30.

In an embodiment of the present invention, the full forward and the offset pressure and/or maximum flow rate of the reverse flow control device 30 may be determined by the choice of components of the pressure transfer wall 40—which may include among other things selection of elasticity constants, spring constants and/or the like of transformable, compressible, elastic and/or the like of components of the pressure transfer wall 40, configuration of components of the pressure transfer wall 40 and/or the like—the configuration of the compressible/elastic element 65—which may include amongst other things selection of elasticity constants, spring constants and/or the like of the compressible/elastic element 65—the physical dimensions of the flow restrictor and/or the physical dimensions of the rate controlling valve 50 etc.

Figure 2:
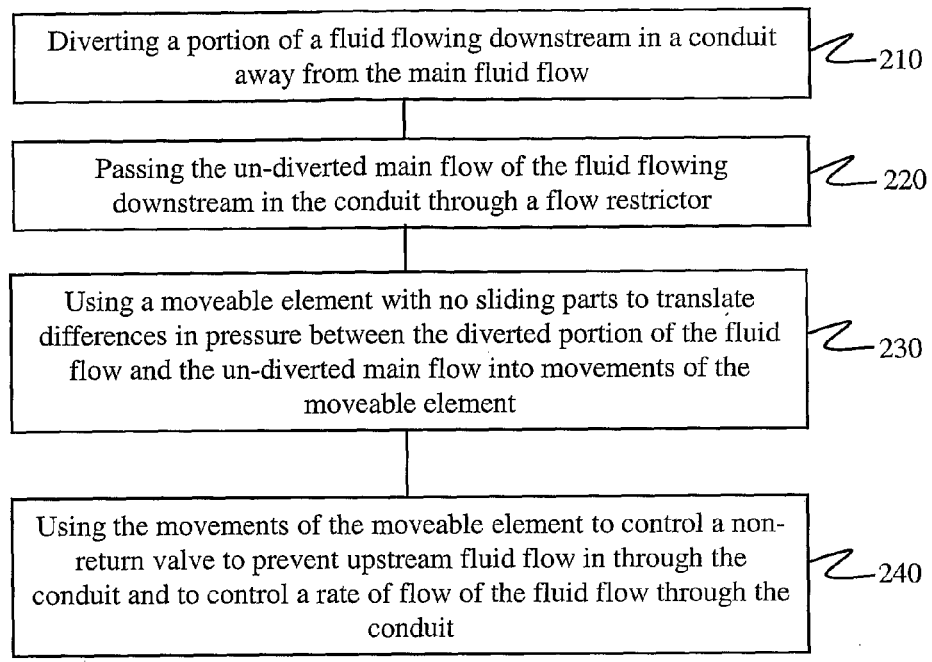
FIG. 2 is a flow-type representation of a method for providing full forward and reverse flow control of a flow in a conduit, in accordance with an embodiment of the present invention.

FIG. 2 is a flow-type representation of a method for providing full forward and reverse flow control of a flow in a conduit, in accordance with an embodiment of the present invention. In step 210, a portion of a fluid flowing downstream in a conduit may be diverted from the main fluid flow in the conduit. Merely by way of example, the fluid flow may contain hydrocarbons, may be a multiphase flow and/or the like. The conduit may be a downhole conduit, a hydrocarbon transport pipeline and/or the like. The conditions of the conduit and/or the fluid may be extreme, including such things as high temperatures, high pressure, corrosive materials, contaminants including solid particles and/or the like.

In step 220, the un-diverted main flow of the fluid flowing downstream in the conduit may be passed through a flow restrictor. By passing the un-diverted main flow through the flow restrictor a pressure differential may be provided across the flow restrictor. In step 230, a moveable element with no sliding parts may be disposed between the diverted fluid flow and the un-diverted main fluid flow in the conduit. The moveable element may comprise a diaphragm, a bellows, foldable elements, an elastic element, a compressive element and/or the like. The moveable element may move in response a differential pressure between the diverted portion of the fluid flow and the un-diverted main fluid flow.

In certain embodiments of the present invention, a compressible/elastic element may be coupled with the moveable element. Merely by way of example, the compressible/elastic element may be a spring, an elastic member and/or the like. In certain aspects of the present invention, the compressible/elastic element may be configured to provide that the moveable element remains in a fixed position and only moves when a certain pressure differential between the diverted portion of the fluid flow and the un-diverted main flow is met or exceeded. In other aspects, the compressible/elastic element may act as a limiter on the motion of the compressible/elastic element. In yet other aspects, the compressible/elastic element may act to counter act or to aid movement of the moveable element in response to a pressure differential between the diverted portion of the fluid flow and the un-diverted main flow.

In step 240, the movements of the moveable element may be used to control a non-return valve to prevent upstream fluid flow in through the conduit and to control a rate of flow of the fluid flow through the conduit. In some embodiments, the moveable element may be coupled with both a non-return regulator and a rate controlling regulator to provide that movements of the moveable element are directly transferred into movements of the non-return regulator and movements of the rate controlling regulator. In some embodiments of the present invention the moveable element and/or the compressible/elastic element may be selected/configured to cap the flow rate at a certain rate, to allow return/upstream flow at certain flow rates and/or the like. Further, in other embodiments, movements of the moveable element may be processed by a control processor and used to control a rate control mechanism and a non-return mechanism.

In certain aspects a processor may be coupled with the moveable element, the non-return regulator and/or the rate controlling regulator to provide for managing of the operation of the fluid control system. Sensors, such as pressure sensors, flow meters, density sensors, viscosity sensors, phase sensors and/or the like may be coupled with the processor to provide for real-time management of the fluid control system. In certain aspects, a fluid conditioner, a filter and/or the like may be positioned upstream of the fluid control system.

In the foregoing description, for the purposes of illustration, various methods and/or procedures were described in a particular order. It should be appreciated that in alternate embodiments, the methods and/or procedures may be performed in an order different than that described.

Hence, while detailed descriptions of one or more embodiments of the invention have been given above, various alternatives, modifications, and equivalents will be apparent to those skilled in the art without varying from the spirit of the invention. Moreover, except where clearly inappropriate or otherwise expressly noted, it should be assumed that the features, devices and/or components of different embodiments can be substituted and/or combined. Thus, the above description should not be taken as limiting the scope of the invention, which is defined by the appended claims.

What is claimed is:

1. A system for controlling flow rate and back flow of a fluid flowing in a conduit, comprising:
   a flow restrictor coupled between the conduit and a flow regulator chamber and configured to control a pressure $P_2$ in the flow regulator chamber, wherein the flow restrictor is configured to control the pressure $P_2$ in the flow regulator chamber by producing a pressure drop in the fluid flowing from the conduit through the flow restrictor into the flow regulator chamber, and wherein the pressure drop across the flow restrictor increases with increased flow rate of the fluid;
   a control chamber configured to receive a portion of the fluid flowing in the conduit from a location upstream of the flow restrictor via a secondary conduit;
   a damping restriction located in the secondary conduit and configured to control a pressure $P_1'$ in the control chamber, wherein the damping restriction is configured to provide that pressure $P_1'$ comprises a pressure at or below a pressure $P_1$ in the conduit upstream of the flow restrictor, and wherein the damping restriction and the flow restrictor are configured to provide that pressure $P_1'$ is at or below pressure $P_1$ and greater than pressure $P_2$;
   a moveable element with no sliding parts positioned so that at least a part of the moveable element is disposed between the control chamber and the flow regulator chamber, wherein the moveable element is configured to move in response to a difference in pressure between the flow regulator chamber and the control chamber;
   a flow rate regulator moveable within an opening in a seating structure and coupled with the moveable element, wherein the flow rate regulator is configured to control the flow rate of the fluid in response to the movement of the moveable element, wherein the flow rate regulator controls the flow rate of the fluid by regulating flow of the fluid through the opening in the seating structure; and
   a non-return valve moveable within an opening in an outlet seating structure and coupled with the flow rate regulator by a connecting member, wherein the non-return valve is configured to control back-flow of the fluid through the opening in the outlet seating structure, and wherein:
   the non-return valve is configured in use to move from an open to a closed position when a pressure downstream of the non-return valve is greater than a pressure upstream of the non-return valve; and
   the non-return valve and the flow rate regulator are configured such that the movement of the non-return valve from an open to a closed position is translated by the connecting member into opening of the flow rate regulator.

2. The system of claim 1, wherein the moveable element comprises a material having a spring constant or an elastic constant.

3. The system of claim 1, further comprising:
   a compressible element coupled with the moveable element and configured to control the movement of the moveable element.

4. The system of claim 1, further comprising:
   an elastic element coupled with the moveable element and configured to control the movement of the moveable element.

5. The system of claim 4, wherein the elastic element is a spring.

6. The system of claim 1, wherein the flow rate regulator is a valve configured to control flow of the fluid through the regulator chamber.

* * * * *